United States Patent
Iizuka et al.

(10) Patent No.: US 7,168,244 B2
(45) Date of Patent: Jan. 30, 2007

(54) CONTROL METHOD FOR AN EXHAUST GAS PURIFICATION SYSTEM AND AN EXHAUST GAS PURIFICATION SYSTEM

(75) Inventors: Akira Iizuka, Fujisawa (JP); Naomi Uchida, Fujisawa (JP); Hitoshi Sato, Fujisawa (JP); Tatsuo Mashiko, Fujisawa (JP); Minoru Tsuchida, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 4 days.

(21) Appl. No.: 11/082,832

(22) Filed: Mar. 18, 2005

(65) Prior Publication Data

US 2006/0000201 A1    Jan. 5, 2006

(30) Foreign Application Priority Data

Apr. 7, 2004    (JP)    ............................. 2004-113375

(51) Int. Cl.
*F01N 3/00*    (2006.01)
(52) U.S. Cl. ............................. 60/295; 60/274; 60/286; 60/297; 60/311
(58) Field of Classification Search .................. 60/274, 60/286, 287, 291, 295, 297, 311
See application file for complete search history.

(56) References Cited

U.S. PATENT DOCUMENTS

| | | | | |
|---|---|---|---|---|
| 4,835,964 A | * | 6/1989 | Kume et al. ................... 60/285 |
| 5,121,601 A | * | 6/1992 | Kammel ........................ 60/275 |
| 5,287,698 A | * | 2/1994 | Shinzawa et al. .............. 60/286 |
| 6,032,461 A | * | 3/2000 | Kinugasa et al. .............. 60/295 |
| 6,865,885 B2 | * | 3/2005 | Kitahara ........................ 60/297 |
| 6,966,179 B2 | * | 11/2005 | Onodera et al. ............... 60/295 |
| 7,028,466 B2 | * | 4/2006 | Kondou et al. ................ 60/295 |

FOREIGN PATENT DOCUMENTS

| | | |
|---|---|---|
| JP | 2003-239789 | 8/2003 |
| JP | 2004-019496 | 1/2004 |

* cited by examiner

*Primary Examiner*—Binh Q. Tran
(74) *Attorney, Agent, or Firm*—Staas & Halsey LLP

(57) ABSTRACT

When an engine cooling water temperature (Tw) detected by a cooling water temperature detection means (37C) exceeds a predetermined judgment water temperatures (Tw1 and Tw2) during the forced regeneration control of a filter using exhaust gas temperature raising means (351C), the actuation of the exhaust gas temperature raising means (351C) is interrupted.

Thereby, in the case of the exhaust gas purification system having a DPF apparatus (13), it is possible to prevent a water temperature meter in a driver seat from abnormally rising during the forced regeneration of a DPF (13*b*) and to prevent a driver from taking the abnormal rise of the water temperature meter for an engine trouble.

9 Claims, 5 Drawing Sheets

CONTROL METHOD FOR AN EXHAUST GAS PURIFICATION SYSTEM AND AN EXHAUST GAS PURIFICATION SYSTEM

BACKGROUND OF THE INVENTION

The present invention relates to an exhaust gas purification system that purifies particulate matters (PM) from the exhaust gas discharged by diesel and other internal combustion engines using a continuous regeneration-type diesel particulate filter (DPF) device and also to a control method thereof.

In the same way as for NOx, CO, and also HC etc., restrictions on the volume of particulate matters (hereinafter "PM") discharged from diesel internal combustion engines grow severe every year. Techniques for collecting this PM in a filter known as a diesel particulate filter (hereinafter "DPF") and for reducing the quantity thereof by discharging externally have been developed. DPF devices and continuous regeneration DPF devices supporting a catalyst represent such.

However, even in continuous regeneration DPF devices, increasing exhaust gas pressure as a result of filter clogging has become a problem. Although the PM collected by these continuous regeneration DPF devices is continuously burned and purified, and the DPF will self-regenerate while the exhaust gas temperature is approximately 350° C. or higher, when the exhaust gas temperature is low or the operating condition of an internal combustion engine has a low NO discharge—for example, when an internal combustion engine has a continuously low exhaust gas temperature accompanied by idling or low load/low speed traveling, etc.—the temperature of the exhaust gas drops and the catalyst becomes inactive as a result of the low temperature thereof. Accordingly, as the oxidization reaction does not progress and NO becomes insufficient, the PM is not oxidized, and the filter does not regenerate. Accordingly, the accumulation of PM in the filter continues and clogging thereof is accelerated.

As a measure against this filter clogging, it has been conceived to forcibly burn and remove the collected PM by forcibly raising the exhaust gas temperature, when the amount of clogging has exceeded a predetermined amount. As for means for detecting the filter clogging, there are some methods such as a method for detecting by the differential pressure across the filter, and a method for detecting through determination of the PM accumulation quantity by calculating the quantity of PM collected from the engine operation state from a predetermined map data. Besides, as a means for exhaust gas temperature raising, as disclosed in Japanese patent application Kokai publication No. 2003-239789, for example, there is a method by a fuel injection control of an intra-cylinder injection of so-called multi injection (multi retarded injection) or post injection (posterior injection) etc., or a method by a fuel injection control in a direct fuel injection in the exhaust pipe. In the intra-cylinder injection control, after a main injection at a timing delayed from a normal burn so as to continue the burn at the delayed timing, an auxiliary injection is executed.

With the intra-cylinder injection control, in the case where the exhaust gas temperature is lower than the active temperature of an oxidation catalyst disposed upstream of the filter or supported on the filter, the exhaust gas temperature is raised by executing the exhaust raising control of the multi injection and the exhaust throttle etc. When attaining to the exhaust gas temperature higher than the active temperature by executing the unburned fuel adding control of a post injection and the like, the fuel in the exhaust gas is burned through oxidation catalyst. Thereby the filter is regenerated through burning and removing collected PM after raising the exhaust gas temperature higher than the temperature the PM in the filter can be burned.

Normally with continuous regeneration DPF devices, when the collecting quantity of PM reaches a preset limit, the operating condition of the internal combustion engine is automatically changed to regeneration mode. In this forced regeneration mode operation, the exhaust gas temperature is forcibly raised and the quantity of NOx is increased. And thereby, the collected PM is oxidized and removed from the filter to regenerate the filter.

Moreover, for example, Japanese patent application Kokai publication No. 2004-19496 discloses an exhaust-gas purification system of an internal combustion engine, in which it is possible to restrain deterioration of fuel efficiency by relatively easy controls and to perform the regeneration safely and efficiently. In the exhaust gas purification system, for a first threshold value and a second threshold value are provided for a collected PM quantity, the DPF is heated and regenerated only when the operation condition is at high temperature raising efficiency in the case where the collected PM quantity is not less than the first threshold value but less than the second threshold value, and regeneration is performed in the case where the collected PM quantity becomes the second threshold value or more, even if the operation condition is not at a high temperature raising efficiency.

Then, to solve the problem of oil dilution due to forced regeneration, a method is proposed which not only automatically performs forced regeneration during traveling but also performs a forced regeneration in a vehicle stationary idling condition when a clogged filter is notified to a driver by a DPF lamp and the driver stops the vehicle and presses a manual regeneration switch. In the case of the manual forced regeneration in the vehicle stationary idling condition, a method is also considered which accelerates self-regeneration by performing the exhaust gas temperature raising control and at the same time, closes an exhaust throttle butterfly.

However, in the case of the forced regeneration of a DPF device, exhaust gas temperature is raised through the exhaust gas temperature raising control or the unburned fuel addition control. However, the temperature of engine cooling water is also raised. Therefore, a problem occurs that a driver can misunderstand that the engine overheats and an engine trouble occurs, upon watching the water temperature rise in the water temperature meter in the driver seat.

For example, in the case of manual regeneration, a driver receiving a warning stops the vehicle and presses a manual regeneration switch to perform a forced regeneration. Then, the idle rotating speed is increased at the time of a vehicle stationary idling, a multi injection is performed by closing an exhaust brake, and a post injection is performed when an exhaust gas temperature rises up to an oxidation catalyst activation temperature or higher. However, when performing the multi injection or post injection, the exhaust gas temperature rises and the engine cooling water temperature also rises. Therefore, the water temperature meter in the driver seat also rises due to the cooling water temperature rise, and thereby, upon watching the water temperature meter, the driver may take it that a vehicle trouble such as an engine trouble occurs.

In the case of manual regeneration, because a driver presses a manual regeneration switch to perform regeneration, the driver does not think that an engine trouble occurs even if a water temperature mater rises by previously providing the information showing that a cooling water temperature rises. However, in the case of an automatic traveling regeneration in which the forced regeneration is performed when a vehicle travels, a driver does not know whether a forced regeneration is carried. Therefore, the driver confusedly thinks that an engine trouble occurs when the water temperature meter rises. Therefore, it is necessary to avoid a rise of the water temperature meter during a forced regeneration control.

SUMMARY OF THE INVENTION

It is an object of the present invention to provide a control method for an exhaust gas purification system and an exhaust gas purification system provided with a DPF device which can avoid a driver from taking the abnormally high temperature of the water temperature meter in the driver seat for an engine trouble, by restraining abnormal rise of the water temperature meter due to the rise of engine cooling water temperature during forced regeneration of the DPF.

In order to achieve the above described purpose of the present invention, a control method for an exhaust gas purification system, in an internal combustion engine mounted on a vehicle provided with a DPF (diesel particulate filter) device in the exhaust passage thereof; having a diesel particulate filter control means including; a regeneration timing judgment means for judging a regeneration timing of a filter of the diesel particulate filter device, an exhaust gas temperature raising means for raising exhaust gas temperature, a cooling water temperature detection means for detecting an engine cooling water temperature, in which said diesel particulate filter control means raises an exhaust gas temperature by the exhaust gas temperature raising means to regenerate the filter by performing a forced regeneration control, when the timing for regeneration is judged by the regeneration timing judgment means and an exhaust gas temperature is low; wherein the actuation of the exhaust gas temperature raising means is interrupted when the engine cooling water temperature detected by the cooling water temperature detection means exceeds a predetermined judgment water temperature, during the forced regeneration control of the filter using the exhaust gas temperature raising means.

Furthermore, the above described control method for the exhaust gas purification system is characterized in that the DPF control means comprises; a manual regeneration mode for performing the forced regeneration control of the filter when a driver presses a manual regeneration switch upon warning to perform a regeneration control under a vehicle stationary idling condition, and an automatic traveling regeneration mode for automatically performing the forced regeneration control of the filter when a vehicle travels; and a first predetermined judgment water temperature in the manual regeneration mode is set to a temperature higher than a second predetermined judgment water temperature in the automatic traveling regeneration mode, in the predetermined judgment water temperature for interrupting the actuation of the exhaust gas temperature raising means.

Moreover, in the case of the above described control method for the exhaust gas purification system, characterized in that the exhaust gas temperature raising means includes at least either a multi injection or an exhaust throttle control.

Furthermore, in the case of the above described control method for the exhaust gas purification system is characterized in that an unburned fuel addition means for post injection control in addition to the actuation of the exhaust gas temperature raising means is actuated in the forced regeneration control of the filter, and when an engine cooling water temperature detected by the cooling water temperature detection means exceeds the predetermined judgment water temperature, the actuation of the exhaust gas temperature raising means as well as the unburned fuel addition means is interrupted.

Furthermore, in the case of the above described exhaust gas purification system, in an internal combustion engine mounted on a vehicle provided with a DPF device in the exhaust gas passage thereof having a DPF control means including; a regeneration timing judgment means for judging a regeneration timing of a filter of the DPF device, an exhaust gas temperature raising means for raising exhaust gas temperature, a cooling water temperature detection means for detecting an engine cooling water temperature, in which said DPF control means raises an exhaust gas temperature by the exhaust gas temperature raising means to regenerate the filter by performing a forced regeneration control, when the timing for regeneration is judged by the regeneration timing judgment means and that an exhaust gas temperature is low; wherein said diesel particulate filter control means is comprised to constitute that the actuation of the exhaust gas temperature raising means is interrupted, when the engine cooling water temperature detected by the cooling water temperature detection means exceeds a predetermined judgment water temperature during the forced regeneration control of the filter using the exhaust gas temperature raising means.

Furthermore, in the case of the above described exhaust gas purification system, wherein said DPF control means comprises a manual regeneration mode for performing the forced regeneration control of the filter when a driver presses a manual regeneration switch upon warning to perform a regeneration control under a vehicle stationary idling condition, and an automatic traveling regeneration mode for automatically performing the forced regeneration control of the filter when a vehicle travels; and in the predetermined judgment water temperature for interrupting the actuation of the exhaust gas temperature raising means, a first predetermined judgment water temperature in the manual regeneration mode is set to a temperature higher than a second predetermined judgment water temperature in the automatic traveling regeneration mode.

Furthermore, in the case of the above described exhaust gas purification system, the DPF device is constituted of any one or a combination of a DPF device formed of a filter without supporting catalyst, a continuous regeneration type DPF device supporting an oxidation catalyst on the filter, a continuous regeneration type DPF device in which an oxidation catalyst is installed on the upstream side of the filter, and a continuous regeneration type DPF device in which an oxidation catalyst is supported on the filter or installed on the upstream side thereof.

According to the control method for an exhaust gas purification system and an exhaust gas purification system of the present invention, a water temperature meter at the driver seat is not abnormally raised during forced regeneration of the DPF and it is possible to avoid that a driver takes an overheat for an engine trouble.

DETAILED DESCRIPTION OF THE PREFERRED EMBODIMENT

Hereinafter, the preferred embodiments of the control method for an exhaust gas purification system and the exhaust gas purification system according to the present invention will be described with reference to the accompanying drawings. The following explanation will use the example of an exhaust gas purification system provided with a continuous regeneration-type diesel particulate filter (DPF) device comprising a combination of an oxidation catalyst and a filter with a catalyst.

Figure 1:
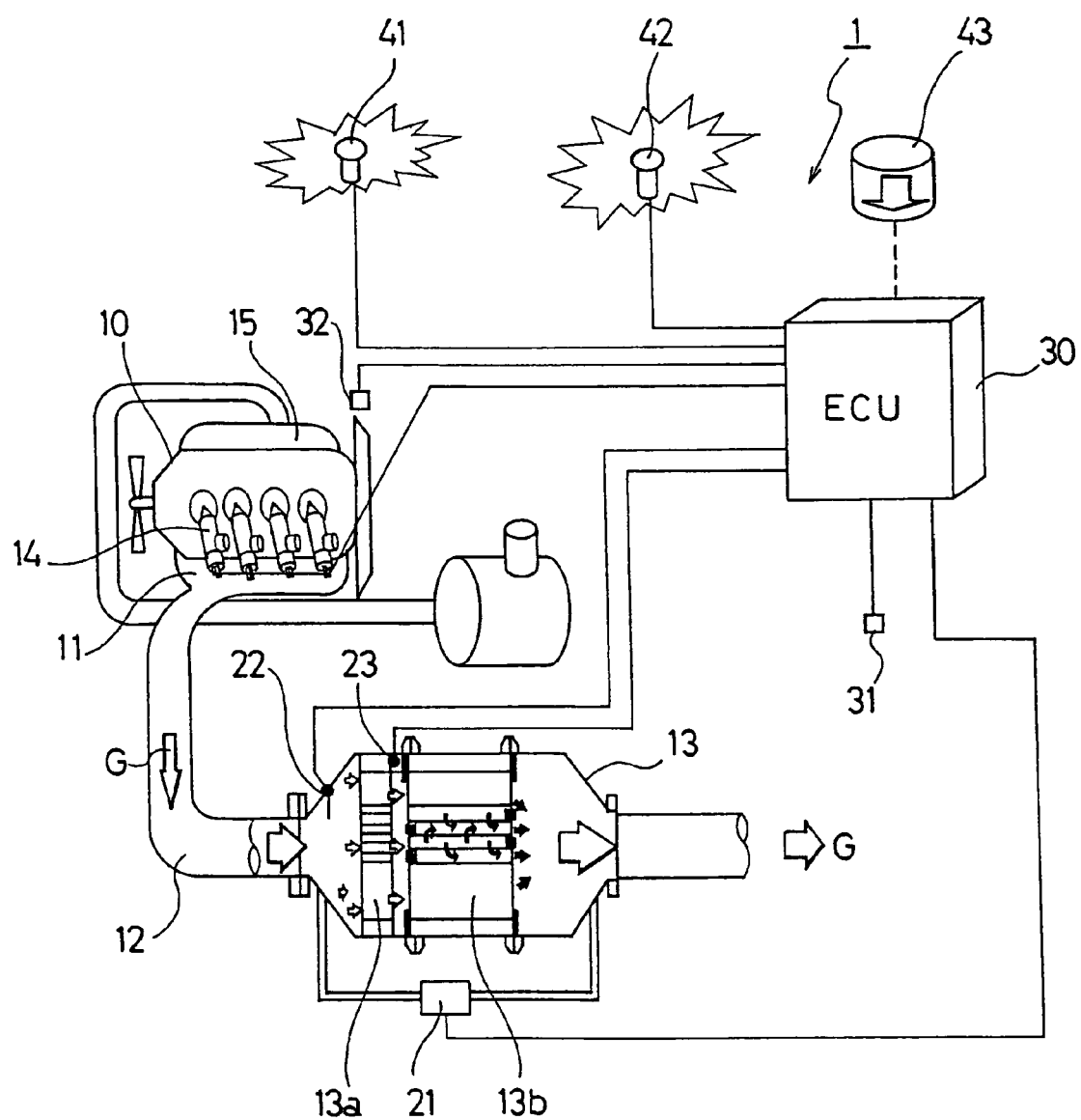
FIG. 1 is a systematic block diagram of the exhaust gas purification system according to an embodiment of the present invention.

FIG. 1 shows the configuration of an exhaust gas purification system 1 for an internal combustion engine according to an embodiment of the present invention. This exhaust gas purification system 1 is configured to provide a continuous regeneration DPF device 13 on an exhaust passage 12 connected to an exhaust manifold 11 of a diesel engine 10. This continuous regeneration DPF device 13 is configured with an oxidation catalyst 13a on the upstream side thereof and a filter with catalyst 13b on the downstream side thereof.

The oxidation catalyst 13a is formed so as to support an oxidation catalyst of platinum (Pt) etc. on a support with a porous ceramic honeycomb structure etc. The filter with catalyst 13b is formed of a monolithic honeycomb type, wall flow type filter with entrances and exits to channels in a porous ceramic honeycomb alternately closed or a felt-type filter with randomly layered alumina other inorganic fibers or the like etc. A platinum or cerium oxide etc. catalyst is supported on this filter portion.

In cases where a monolithic honeycomb type, wall flow type filter is used as the filter with catalyst 13b, the particulate matter (PM) contained in the exhaust gas is collected (trapped) in the porous ceramic walls. When a fabric type filter type is used, PM is collected in the inorganic fibers thereof.

A differential pressure sensor 21 is provided on the conduit tube in front of and behind the continuous regeneration DPF device 13 in order to estimate the collecting quantity of PM on the filter with catalyst 13b. For the purpose of regeneration control of the filter with catalyst 13b, furthermore, an oxidation catalyst inlet exhaust gas temperature sensor 22 is provided upstream of the oxidation catalyst 13a and a filter inlet exhaust gas temperature sensor 23 is provided between the oxidation catalyst 13a and the filter with catalyst 13b.

The output values from these sensors are input to an engine control unit (ECU) 30. In addition to controlling the overall operation of the engine 10, the engine control unit 30 also performs regeneration control of the operation of the continuous regeneration DPF device 13. In accordance with the control signals output from this engine control unit 30, the fuel injection devices (i.e., injection nozzles) 14 of the engine 10, the intake throttle valve (not shown) adjusting the intake quantity of the intake manifold 15 and the EGR valve for adjusting the EGR volume etc. are also controlled thereby. The EGR valve is provided together with the EGR cooler on the EGR passage (not shown).

These fuel injection devices 14 are connected to a common-rail fuel injection system (not shown) storing temporarily the fuel pressurized to high pressure by the fuel pump (not shown). In order to operate the engine, the accelerator opening from the accelerator position sensor (APS) 31 and the engine speed from the engine speed sensor 32 etc. are input into the engine control unit 30 together with other data such as the vehicle speed and cooling water temperature, etc.

Figure 2:
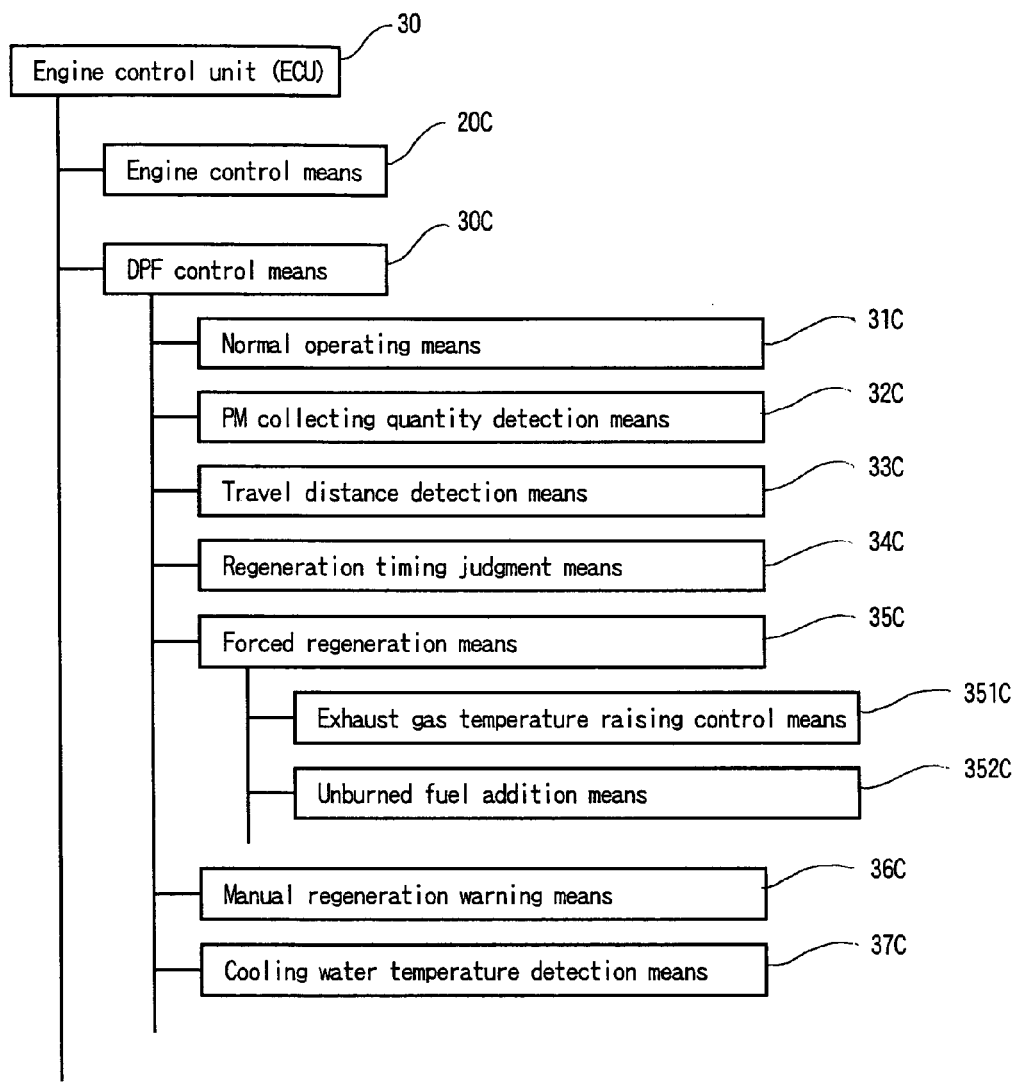
FIG. 2 is a drawing showing the control means configuration for the exhaust gas purification system according to an embodiment of the present invention.

As shown in FIG. 2, the engine control device 30 according to the present invention comprises an engine control means 20C controlling operating of the engine and a diesel particulate filter (DPF) control means 30C for the exhaust gas purification system 1 etc. The DPF control means 30C comprises a normal operating means 31C, a PM collecting quantity detection means 32C, a travel distance detection means 33C, a regeneration timing judgment means 34C, a forced regeneration means 35C, a manual regeneration warning means 36C, a cooling water temperature detection means 37C, etc.

The normal operating means 31C is in particular a means for performing normal operating unrelated to regeneration of the continuous regeneration DPF device 13. With normal operating control means 31C, normal injection control is carried out wherein a predetermined volume of fuel is injected from the fuel injection devices 14 in accordance with an electric current time signal calculated in the engine control device 30 based on signals from the accelerator position sensor 31 and signals from the engine speed sensor 32.

The PM collecting quantity detection means 32C is a means for detecting the PM collecting quantity accumulated in the filter with catalyst 13b of the continuous regeneration DPF device 13. In this embodiment, detection thereof is carried out based on the differential pressure before and after the continuous regeneration DPF device 13—that is, the measurement values $\Delta Pm$ from the differential pressure sensor 21.

The travel distance detection means 33C is a means for detecting the travel distance $\Delta Mc$ traveled by the vehicle after DPF regeneration. Whenever forced regeneration is carried out, this distance $\Delta Mc$ is reset at a suitable timing from the start of regeneration to the end thereof.

The regeneration timing judgment means 34C is a means for judging a regeneration start timing of DPF based on comparison of the differential pressure detection value $\Delta Pm$ detected by the PM collecting quantity detection means 32C and the travel distance $\Delta Mc$ detected by the travel distance detection means 33C with respective predetermined judgment values.

Although the control varies slightly in accordance with the type of the continuous regeneration DPF device 13, the forced regeneration means 35C comprises an exhaust gas temperature raising means 351C and an unburned fuel addition means 352C. The exhaust gas temperature raising means 351C performs multi injection (multi retarded injection) in an intra-cylinder injection of the engine 10, or performs exhaust throttle control, thereby raising the exhaust gas temperature to the active temperature of the oxidation catalyst 13a. The unburned fuel addition means 352C performs post injection thereafter, and adds unburned fuel to the exhaust gas. By oxidizing the unburned fuel with the oxidation catalyst 13a, the filter inlet exhaust gas temperature detected by the filter inlet exhaust gas temperature sensor 23 is raised, realizing a suitable temperature and environment for PM oxidation and removal.

In accordance with these means 351C and 352C, the PM accumulated on the filter with catalyst 13b is forcibly burned and removed, and the filter with catalyst 13b is forcibly regenerated. Furthermore, in addition to the multi injection, the exhaust gas temperature raising means 351C is also possible to use the exhaust throttle control. Furthermore, it is also possible to use the intake throttle control and the EGR control in combination during the course of control by the exhaust gas temperature raising and unburned fuel addition.

The manual regeneration warning means 36C comprises a flashing lamp (or DPF lamp) 41 and a warning lamp 42, etc. This manual regeneration warning means 36C is a means for urging the driver through flashing of the flashing lamp 41 to manually actuate the forced regeneration means 35C, and through the lighting of the warning lamp 42, to bring the vehicle to a service center. Furthermore, upon receiving of this warning, the driver is capable of actuating the forced regeneration means 35C through a manual operation of a regeneration switch (manual regeneration switch) 43.

The cooling water temperature detection means 37C is configured with the water temperature sensor 33 etc. and is a means for detecting engine cooling water temperature Tw.

And the DPF control means 30C having the above described various means is configured as follows. Based on the DPF differential pressure before and behind $\Delta Pm$ detected by the PM collecting quantity detection means 32C and the travel distance $\Delta Mc$ detected by the travel distance detection means 33C after DPF regeneration, normal operating is continued by the normal operating means 31C, the driver is urged to manually actuate the forced regeneration means 35C, or the forced regeneration means 35C is automatically actuated.

Then, the DPF regeneration control of the exhaust gas purification system 1 is described below. In the case of the control of the exhaust gas purification system 1, normal operation is performed by normal operating control means 31C to collect PM, in this normal operation, when the start of regeneration is judged by a regeneration timing judgment means 34C, a warning by a manual regeneration warning means 36C or automatic traveling regeneration by a forced regeneration means 35C is performed.

That is the necessity of a manual regeneration or an automatic traveling regeneration is judged depending on whether the DPF differential pressure before and after $\Delta Pm$ detected by the PM collecting quantity detection means 32C and travel distance $\Delta Mc$ detected by the travel distance detection means 33C are respectively kept in a predetermined range. Moreover, the normal operation is performed by the normal operating control means 31C after various operations are performed as necessary. Then, a vehicle is driven repeating the normal operation and the regeneration control.

Figure 4:
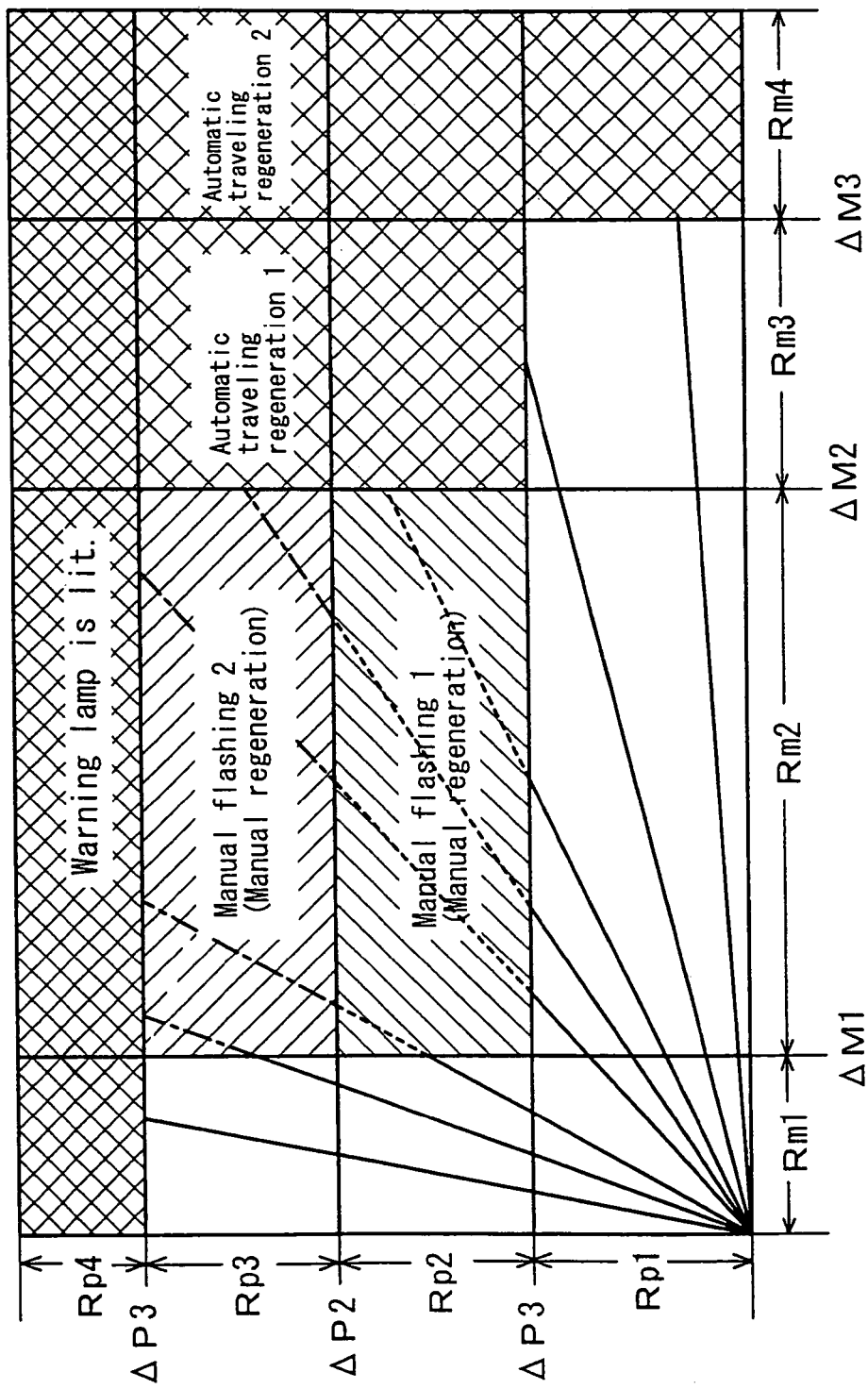
FIG. 4 is a drawing showing in a schematic manner the regeneration control map of the exhaust gas purification system.

The regeneration control is described by referring to the regeneration control map shown in FIG. 4. The regeneration control can be performed in accordance with the regeneration control flow shown in FIG. 5.

First, when the travel distance $\Delta Mc$ is in a region Rm1 which is smaller than the first threshold value $\Delta M1$, a problem of oil dilution occurs by performing forced regeneration because the evaporation of the fuel in oil is insufficient. Therefore, the regeneration control is inhibited in order to avoid the problem.

Then, when the travel distance $\Delta Mc$ is in a predetermined range Rm2 between the first threshold value $\Delta M1$ and the second threshold value $\Delta M2$, an automatic forced regeneration is not performed because traveling is still insufficient and the fuel mixed in engine oil is not sufficiently evaporated. Moreover, to prompt manual regeneration for performing forced regeneration by stopping a vehicle and pressing a manual regeneration switch 43, when the detected DPF differential pressure before and behind $\Delta Pm$ exceeds the first threshold value $\Delta P1$ (manual flashing 1), a repeater indicator (DPF lamp) 41 is slowly flashed. Moreover, when the detected DPF front-rear pressure difference $\Delta Pm$ exceeds the second threshold value $\Delta P2$ (manual flashing 2) larger than the first threshold value $\Delta P1$, the repeater indicator 41 is quickly flashed. Thereby, a driver is strongly prompted to actuate manual forced regeneration after stopping the vehicle.

Furthermore, when the travel distance $\Delta Mc$ is in a predetermined range Rm3 between the second threshold value $\Delta M2$ and third threshold value $\Delta M3$, the fuel mixed in engine oil is sufficiently evaporated and the automatic forced regeneration during traveling (automatic traveling regeneration) can be made. Therefore, when the detected DPF differential pressure before and behind $\Delta Pm$ exceeds the first threshold value $\Delta P1$ (automatic traveling regeneration 1), a forced regeneration control is automatically performed. By the automatic traveling regeneration, the load on the manual forced regeneration by a driver, that is, the on/off operation of the manual regeneration switch 43 is decreased.

Moreover, independently of the detected DPF differential pressure before and behind $\Delta Pm$, when the travel distance $\Delta Mc$ is in a predetermined range Rm4 exceeding the third threshold value $\Delta M3$ (automatic traveling regeneration 2), the forced regeneration is automatically performed in order to prevent heat runaway due to uneven loading of PM in the filter with catalyst 13b and dissolution loss of DPF.

When the detected DPF differential pressure before and behind $\Delta Pm$ exceeds the third threshold value $\Delta P3$ (Rp4: flashing of alarm lamp) independently of the travel distance $\Delta Mc$, a condition is set in which manual regeneration and automatic traveling regeneration are inhibited in order to avoid a heat runaway which is a rapid burning of PM and a warning lamp 42 for prompting a user to bring the vehicle to a service center.

Therefore, the DPF control means 30C is constituted by including a manual regeneration mode for performing the forced regeneration control of the filter with catalyst 13b when a driver presses the manual regeneration switch 43 upon a warning to perform regeneration control while a vehicle is in a stationary idling condition and an automatic traveling regeneration mode for automatically performing the forced regeneration control of the filter with catalyst 13b while the vehicle is in a traveling condition.

Figure 5:
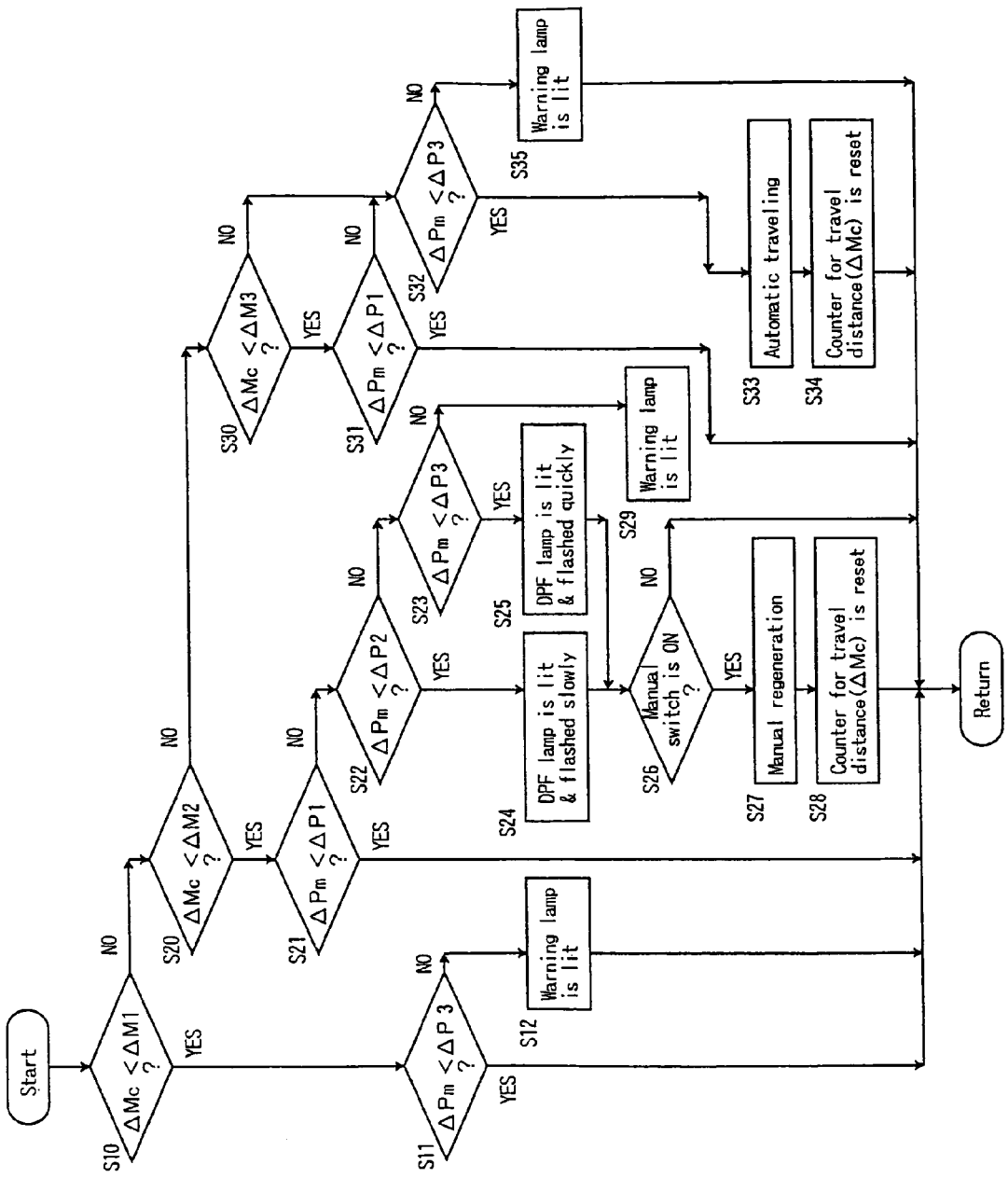
FIG. 5 is a drawing showing the regeneration control flow of the exhaust gas purification system.

Moreover, in the case of the present invention, as shown in FIG. 5, when the forced regeneration of the DPF device 13 is performed by the forced regeneration means 35C through the manual regeneration in step S27 or the automatic traveling regeneration in step S33, the DPF control means 30C is constituted as shown below in order to prevent abnormal rise of engine cooling water temperature causing misunderstanding of a user with an engine trouble.

When the engine cooling water temperature Tw detected by cooling water detecting means 37C exceeds predetermined judgment water temperatures Tw1 and Tw2 during the forced regeneration control of the filter with catalyst 13b using exhaust gas temperature raising means 351, the DPF control means 30C is constituted so as to perform the control for interrupting the actuation of the exhaust gas temperature raising means 351C and moreover when unburned fuel addition control by post injection is performed, also interrupt the actuation of unburned fuel addition means 352C.

Then, in the case of the predetermined judgment water temperatures Tw1 and Tw2 for interrupting the actuation of the exhaust gas temperature raising means 351C, the predetermined first judgment water temperature Tw1 in the manual regeneration mode is set to a temperature higher than the predetermined second judgment water temperature Tw2 in the automatic traveling regeneration mode.

Figure 3:
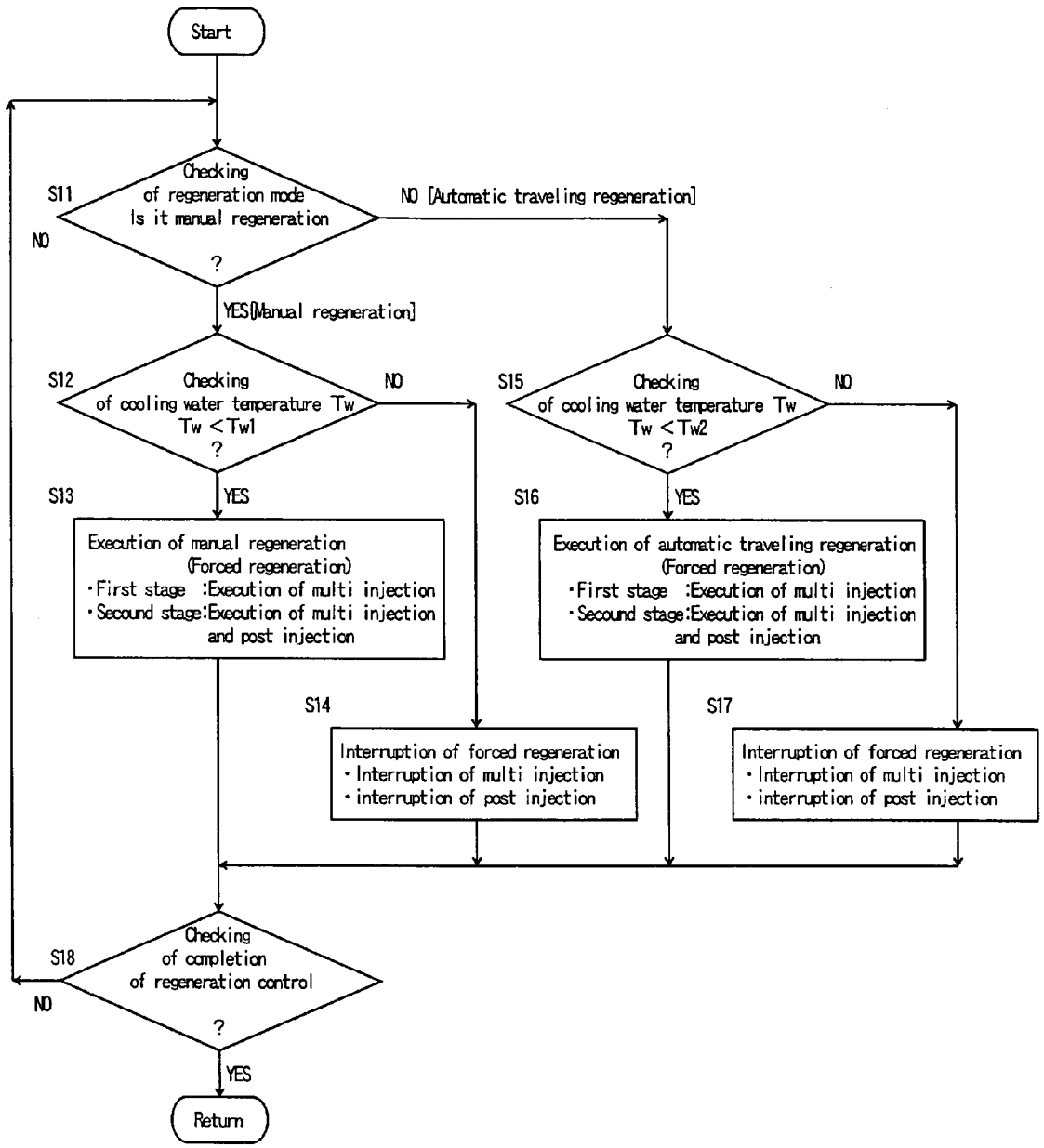
FIG. 3 is a drawing showing a control flow of the forced regeneration with relation to the engine cooling water temperature according to an embodiment of the present invention.

Then, the forced regeneration control relating to the above described engine cooling water temperature Tw can be performed in accordance with the control flow shown in FIG. 3. The control flow in FIG. 3 is shown as a control flow to be called when the forced regeneration of the DPF device 13 is performed by the forced regeneration means 35C in accordance with the manual regeneration in step S27 or automatic traveling regeneration in step S33 in FIG. 5.

When the control flow is called and started, regeneration mode is checked to judge whether it is in a manual regeneration or in an automatic traveling regeneration in step S11.

When it is judged to be in the manual regeneration, the engine cooling water temperature Tw is checked in step S12. That is, when the engine cooling water temperature Tw is lower than the predetermined first judgment water temperature Tw1, the forced regeneration means 35C is actuated in step S13, and when the temperature Tw is higher than the temperature Tw1, the actuation of the forced regeneration means 35C is interrupted in step S14.

Though a detailed control flow is omitted, in the case of the forced regeneration control by the manual regeneration in step S13, only the exhaust gas temperature raising control according to the first-stage multi injection is performed when an exhaust gas temperature is lower than a predetermined judgment exhaust gas temperature. When the exhaust gas temperature exceeds the predetermined judgment exhaust gas temperature, the multi injection progresses to the second stage to further perform exhaust gas temperature raising control. In this case, this exhaust gas temperature raising control is the unburned fuel addition control by post injection in addition to the exhaust gas temperature raising control by multi injection. Then, the forced regeneration control is performed for a predetermined control time $\Delta$ tc relating to the interval of checking of the regeneration mode or the interval of checking of the engine cooling water temperature Tw and the step goes to step S18.

Moreover, in step S12, when the engine cooling water temperature Tw is equal to or higher than the predetermined first judgment water temperature Tw1, after the forced regeneration control such as the multi injection and the post injection in step S14 is interrupted, and the predetermined control time $\Delta$ tc elapses, the step goes to S18.

When it is judged to be in the automatic traveling regeneration mode through checking of the regeneration mode in step S11, the engine cooling water temperature Tw is checked in step S15. That is, when engine cooling water temperature Tw is lower than the predetermined second judgment water temperature Tw2, the forced regeneration control means 35C is actuated by the automatic traveling regeneration in step S16. When the temperature Tw is higher than the temperature Tw2, the actuation of the forced regeneration means 35C is interrupted in step S17. Because the cooling water temperature Tw easily rises during traveling, more appropriate regeneration control is performed by setting the predetermined second judgment water temperature Tw2 during automatic traveling regeneration to lower than the predetermined first judgment water temperature Tw1.

Though a detailed control flow is omitted, in the case of the forced regeneration control by the automatic traveling regeneration in step S16, when the exhaust gas temperature is lower than a predetermined judgment exhaust gas temperature, only the exhaust gas temperature raising control is performed by the first-stage multi injection. When the exhaust gas temperature exceeds a predetermined judgment exhaust gas temperature, the exhaust gas temperature raising control by the second-stage multi injection and the unburned fuel addition control by the post injection are performed. Then, when the forced regeneration control by these automatic traveling regenerations is performed in the predetermined control time $\Delta$ tc relating to the interval of checking of a regeneration mode and the interval of checking of the engine cooling water temperature and step S18 is started.

Moreover, in step S15, when the engine cooling water temperature Tw is not less than the predetermined second judgment water temperature tw2, step S17 is started to interrupt the forced regeneration of multiple injection and post injection and step S18 is started after the predetermined control time $\Delta$ tc is elapsed.

In step S18, it is checked whether regeneration control is completed. This checking is performed depending on whether the DPF front-rear pressure difference $\Delta$ Pm becomes lower or not than a predetermined completion judgment pressure difference or whether the forced regeneration execution accumulated time passes the predetermined completion judgment time.

In step S18, when it is judged that regeneration control is not completed, the step returns to step S11 and steps S11 to S18 are repeated. Moreover, when it is judged in step S18 that the regeneration control is completed, the regeneration control is terminated and the step returns.

According to the control flow as shown in FIG. 3, when the engine cooling water temperature Tw detected by the cooling water temperature detection means 37C during the forced regeneration control of the filter with catalyst 13b using the exhaust gas temperature raising means 351C exceeds the predetermined judgment water temperatures Tw1 and Tw2, it is possible to interrupt the actuation of the exhaust gas temperature raising means 351C. Further, when the unburned fuel addition means 352C is actuated, it is possible to interrupt the actuation of the exhaust gas temperature raising means 351C and also to interrupt the actuation of the unburned fuel addition means 352C.

Thereby, it is possible to prevent an abnormal rise of the water temperature meter in a driver seat caused by the rise of the engine cooling water temperature Tw during the forced regeneration of the filter with catalyst 13b of the continuous regeneration type DPF device 13. Consequently, it is possible to avoid a driver seeing the water temperature meter from taking it for an engine trouble.

The above explanation deals with the example of a DPF device in the exhaust gas purification system realized as a DPF device providing an oxidation catalyst on the upstream side of the filter while also making a catalyst supported on the filter; however, the present invention is not restricted to this embodiment. Furthermore, the continuous regeneration-type DPF device may also be of the type not supporting a catalyst on the filter, making an oxidation catalyst supported on the filter or providing an oxidation catalyst on the upstream side of the filter, etc.

What is claimed is:

1. A control method for an exhaust gas purification system, in an internal combustion engine, provided with a diesel particulate filter device in the exhaust passage thereof and having a diesel particulate filter control means comprising:

regeneration timing judgment means for judging a regeneration timing of a filter of the diesel particulate filter device;

exhaust gas temperature raising means for raising an exhaust gas temperature; and cooling water temperature detection means for detecting an engine cooling water temperature, in which said diesel particulate filter control means raises an exhaust gas temperature by the exhaust gas temperature raising means to regenerate the filter by performing a forced regeneration control, when the timing for regeneration is judged by the regeneration timing judgment means and an exhaust gas temperature is low;

wherein the actuation of the exhaust gas temperature raising means is interrupted when the engine cooling water temperature detected by the cooling water temperature detection means exceeds a predetermined judgment water temperature, during the forced regeneration control of the filter using the exhaust gas temperature raising means.

2. The control method for the exhaust gas purification system of claim 1, wherein said diesel particulate filter control means comprises:

a manual regeneration mode for performing the forced regeneration control of the filter when a driver presses a manual regeneration switch upon warning to perform a regeneration control under a vehicle stationary idling condition, and an automatic traveling regeneration mode for automatically performing the forced regeneration control of the filter when a vehicle travels; and a first predetermined judgment water temperature in the manual regeneration mode is set to a temperature higher than a second predetermined judgment water temperature in the automatic traveling regeneration mode, in the predetermined judgment water temperature for interrupting the actuation of the exhaust gas temperature raising means.

3. The control method for the exhaust gas purification system of claim 1, wherein the exhaust gas temperature raising means includes at least either a multi injection or an exhaust throttle control.

4. The control method for the exhaust gas purification system of claim 1, wherein an unburned fuel addition means for post injection control in addition to the actuation of the exhaust gas temperature raising means is actuated in the forced regeneration control of the filter, and when an engine cooling water temperature detected by the cooling water temperature detection means exceeds the predetermined judgment water temperature, the actuation of the exhaust gas temperature raising means as well as the unburned fuel addition means is interrupted.

5. An exhaust gas purification system, in an internal combustion engine, provided with a diesel particulate filter device in the exhaust gas passage thereof and having a diesel particulate filter control means comprising:

regeneration timing judgment means for judging a regeneration timing of a filter of the diesel particulate filter device;

exhaust gas temperature raising means for raising an exhaust gas temperature; and cooling water temperature detection means for detecting an engine cooling water temperature;

wherein said diesel particulate filter control means raises an exhaust gas temperature by the exhaust gas temperature raising means to regenerate the filter by performing a forced regeneration control, when the timing for regeneration is judged by the regeneration timing judgment means and that an exhaust gas temperature is low, wherein said diesel particulate filter control means interrupts actuation of the exhaust gas temperature raising means, when the engine cooling water temperature detected by the cooling water temperature detection means exceeds a predetermined judgment water temperature during the forced regeneration control of the filter using the exhaust gas temperature raising means.

6. The exhaust gas purification system of claim 5, wherein said diesel particulate filter control means comprises:

a manual regeneration mode for performing the forced regeneration control of the filter when a driver presses a manual regeneration switch upon warning to perform a regeneration control under a vehicle stationary idling condition, and an automatic traveling regeneration mode for automatically performing the forced regeneration control of the filter when a vehicle travels; and in the predetermined judgment water temperature for interrupting the actuation of the exhaust gas temperature raising means, a first predetermined judgment water temperature in the manual regeneration mode is set to a temperature higher than a second predetermined judgment water temperature in the automatic traveling regeneration mode.

7. The exhaust gas purification system of claim 5, wherein the diesel particulate filter device is constituted of any one or a combination of;

a diesel particulate filter device formed of a filter without supporting catalyst, a continuous regeneration type diesel particulate filter device supporting an oxidation catalyst on the filter, a continuous regeneration type diesel particulate filter device in which an oxidation catalyst is installed on the upstream side of the filter, and a continuous regeneration type diesel particulate filter device in which an oxidation catalyst is supported on the filter or installed on the upstream side thereof.

8. A particulate filter control method, comprising:

raising an exhaust gas temperature to regenerate a particulate filter by performing a forced regeneration control;

detecting an engine cooling water temperature;

interrupting the raising of the exhaust gas temperature when the engine cooling water temperature exceeds a predetermined temperature, during the forced regeneration control of the filter.

9. A system, comprising:

a particulate filter controller, including an exhaust gas temperature heater raising an exhaust gas temperature, a cooling water temperature detector detecting an engine cooling water temperature, wherein said particulate filter controller controls the exhaust gas temperature heater to raise the exhaust gas temperature to regenerate a filter by performing a forced regeneration control, and wherein said particulate filter controller interrupts the actuation of the exhaust gas temperature heater, when the engine cooling water temperature detected by the cooling water temperature detector exceeds a predetermined water temperature during the forced regeneration control of the filter.

* * * * *